(12) United States Patent
Ogata

(10) Patent No.: US 9,246,750 B2
(45) Date of Patent: Jan. 26, 2016

(54) WIRELESS COMMUNICATION APPARATUS AND WIRELESS COMMUNICATION METHOD

(75) Inventor: Hideki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 470 days.

(21) Appl. No.: 13/698,528

(22) PCT Filed: May 16, 2011

(86) PCT No.: PCT/JP2011/061135
§ 371 (c)(1),
(2), (4) Date: Jan. 4, 2013

(87) PCT Pub. No.: WO2011/145540
PCT Pub. Date: Nov. 24, 2011

(65) Prior Publication Data
US 2013/0107700 A1 May 2, 2013

(30) Foreign Application Priority Data
May 20, 2010 (JP) ................................. 2010-116407

(51) Int. Cl.
*H04W 84/12* (2009.01)
*H04L 12/24* (2006.01)
(Continued)

(52) U.S. Cl.
CPC .............. *H04L 41/0654* (2013.01); *H04B 1/74* (2013.01); *H04L 25/0264* (2013.01); *H04W 84/12* (2013.01); *H04W 24/08* (2013.01)

(58) Field of Classification Search
None
See application file for complete search history.

(56) References Cited

U.S. PATENT DOCUMENTS 8,190,105 B2 * 5/2012 Hagiwara et al. ............. 455/102
(Continued)

FOREIGN PATENT DOCUMENTS

| JP | 4-275723 A | 10/1992 |
| JP | 2002-26909 A | 1/2002 |
| JP | 200432633 A | 1/2004 |
| JP | 2005-27173 A | 1/2005 |

(Continued)

OTHER PUBLICATIONS

Office Action dated Dec. 25, 2013 issued by the State Intellectual Property Office of the People's Republic of China in counterpart Chinese Patent Application No. 201180024551.6.

(Continued)

*Primary Examiner* — Kevin C Harper
*Assistant Examiner* — Derrick V Rose
(74) *Attorney, Agent, or Firm* — Sughrue Mion, PLLC

(57) ABSTRACT

A wireless communication apparatus of the present invention that uses an adaptive modulation radio scheme, includes: two-system transmission paths of an active system transmission path and an auxiliary system transmission path; a line information acquiring unit that acquires line information indicating line states of the active system transmission path and the auxiliary system transmission path; and a signal processing unit that determines whether or not a fault occurs in the active system transmission path and the auxiliary system transmission path, based on the line information acquired by the line information acquiring unit. The signal processing unit performs a setting so as to perform wireless communication using the two-system transmission paths of the active system transmission path and the auxiliary system transmission path, in a case of determining that a fault does not occur in the active system transmission path and the auxiliary system transmission path. The signal processing unit performs a setting so as to perform wireless communication using only the transmission path in which a fault does not occur among the active system transmission path and the auxiliary system transmission path, in a case of determining that a fault occurs in either one of the active system transmission path and the auxiliary system transmission path.

2 Claims, 2 Drawing Sheets

(51) Int. Cl.
  *H04B 1/74*  (2006.01)
  *H04L 25/02* (2006.01)
  *H04W 24/08* (2009.01)

(56) References Cited

U.S. PATENT DOCUMENTS

2002/0016874 A1    2/2002  Watanuki et al.
2005/0069064 A1*   3/2005  Propp et al. .................... 375/350
2010/0329110 A1*  12/2010  Rose et al. ..................... 370/217

FOREIGN PATENT DOCUMENTS

JP    2005-218063 A    8/2005
JP    2009-194793 A    8/2009

OTHER PUBLICATIONS

Office Action dated Jan. 21, 2014 issued by the Japanese Patent Office in counterpart Japanese Patent Application No. 2012515868.
International Search Report for PCT/JP2011/061135 dated Aug. 2, 2011.

* cited by examiner

WIRELESS COMMUNICATION APPARATUS AND WIRELESS COMMUNICATION METHOD

TECHNICAL FIELD

The present invention relates to a wireless communication apparatus that uses a LAN (Local Area Network) by a wireless scheme, and a wireless communication method.

BACKGROUND ART

There is conventionally known a twin-path constitution that provides two systems of communication paths, so that when a fault occurs in one communication path, the other communication path is switched over to so as to prevent the communication path from being severed. FIG. 2 shows the twin-path constitution in a conventional wireless communication apparatus. In the wireless communication apparatus (sending side) 101, a LAN (Local Area Network) signal that is input via a layer 2 switch 102 is converted to a wireless frame via a wireless frame converting unit 103. The wireless frame converting unit 103 branches the signal to output an active system main signal 106 and an auxiliary system main signal 107 to an active system modulation/demodulation unit 104 and an auxiliary system modulation/demodulation unit 105, respectively. The active system modulation/demodulation unit 104 and the auxiliary system modulation/demodulation unit 105 transmit the active system main signal 106 and the auxiliary system main signal 107 by wireless communication, respectively.

In a wireless communication apparatus (receiving side) 201, an active system main signal 207 and an auxiliary system main signal 208 that have demodulated by an active system modulation/demodulation unit 202 and an auxiliary system modulation/demodulation unit 203, respectively, are input to a signal selection switch 204. The signal selection switch 204 selects the active system main signal 207, and outputs it via a wireless frame converting unit 205 and a layer 2 switch 206. In the case of a fault occurring in the active system, the signal selection switch 204 switches over so as to select the auxiliary system main signal 208 and outputs it.

Patent Document 1 discloses as a conventional art a channel multiplexing method that enhances availability of the entire network system without revising a device loaded with an existing channel multiplexing technology. This channel multiplexing method, in the case of a fault being detected, interrupts all LAN channels belonging to the same group as the LAN channel in which the fault occurred, presses an information repeater apparatus and a channel multiplexer unit in the terminal to use another LAN channel in which no fault has occurred, and then continues performing the communication.

Patent Document 2 discloses a wireless communication system that transmits a switching signal to a monitor control board of a host station and suspends polling during switchover execution in order to achieve stable monitor control, when switching between an active line and an auxiliary line occurs. By this system, a non-communication state until the timeout for waiting for the response from the slave station is detected can be eliminated, and notification failure of an alarm to the host station or a loss of response of the control can be prevented.

PRIOR ART DOCUMENTS

Patent Documents

[Patent Document 1] Japanese Unexamined Patent Application, First Publication No. 2002-026909

[Patent Document 2] Japanese Unexamined Patent Application, First Publication No. 2005-218063

SUMMARY OF THE INVENTION

Problem to be Solved by the Invention

However, the conventional twin-path constitution shown in FIG. 2 is constituted so that the wireless communication apparatus on the sending side branches the same main signal and transmits them by two systems, and the wireless communication apparatus at the receiving side selects either one. For that reason, regardless of the auxiliary system, whose main signal is not selected, occupies a frequency and outputs a wireless signal in the same manner as the active system, it is not operated for signal transmission, and so the problem arises of the frequency and electrical power being wasted. Also, when the wireless bandwidth is reduced in a wireless communication apparatus that uses an adaptive modulation radio scheme, the LAN transmission capacity also is reduced simultaneously, and so the state arises of correspondence with a network with a large bandwidth being difficult.

The present invention has been achieved in view of the above circumstances. One exemplary object of the present invention is to prove a wireless communication apparatus and a wireless communication method that, in a twin-path constitution of a wireless communication apparatus, can secure the transmission capacity of a LAN by operating the auxiliary system for signal transmission in the same manner as the active system in the case of there being no fault.

Means for Solving the Problem

A wireless communication apparatus of the present invention that uses an adaptive modulation radio scheme, includes: two-system transmission paths of an active system transmission path and an auxiliary system transmission path; a line information acquiring unit that acquires line information indicating line states of the active system transmission path and the auxiliary system transmission path; and a signal processing unit that determines whether or not a fault occurs in the active system transmission path and the auxiliary system transmission path, based on the line information acquired by the line information acquiring unit. The signal processing unit performs a setting so as to perform wireless communication using the two-system transmission paths of the active system transmission path and the auxiliary system transmission path, in a case of determining that a fault does not occur in the active system transmission path and the auxiliary system transmission path. The signal processing unit performs a setting so as to perform wireless communication using only the transmission path in which a fault does not occur among the active system transmission path and the auxiliary system transmission path, in a case of determining that a fault occurs in either one of the active system transmission path and the auxiliary system transmission path.

A wireless communication method of the present invention for a wireless communication apparatus that uses an adaptive modulation radio scheme, includes: a line information acquiring step of acquiring line information indicating line states of an active system transmission path and an auxiliary system transmission path; and a signal processing step of determining whether or not a fault occurs in the active system transmission path and the auxiliary system transmission path, based on the line information acquired by the line information acquiring step. The signal processing step performs a setting so as to perform wireless communication using the two-system transmission paths of the active system transmission path and the auxiliary system transmission path, in a case of determining that a fault does not occur in the active system transmission path and the auxiliary system transmission path. The signal processing step performs a setting so as to perform wireless communication using only the transmission path in which a fault does not occur among the active system transmission path and the auxiliary system transmission path, in a case of determining that a fault occurs in either one of the active system transmission path and the auxiliary system transmission path.

Effect of the Invention

According to an exemplary embodiment of the present invention, in the wireless communication apparatus that has an adaptive modulation radio scheme function that constitutes twin paths, by using both the active system and the auxiliary system for signal transmission, it is possible to secure double the conventional LAN transmission capacity.

EMBODIMENTS FOR CARRYING OUT THE INVENTION

Figure 1:
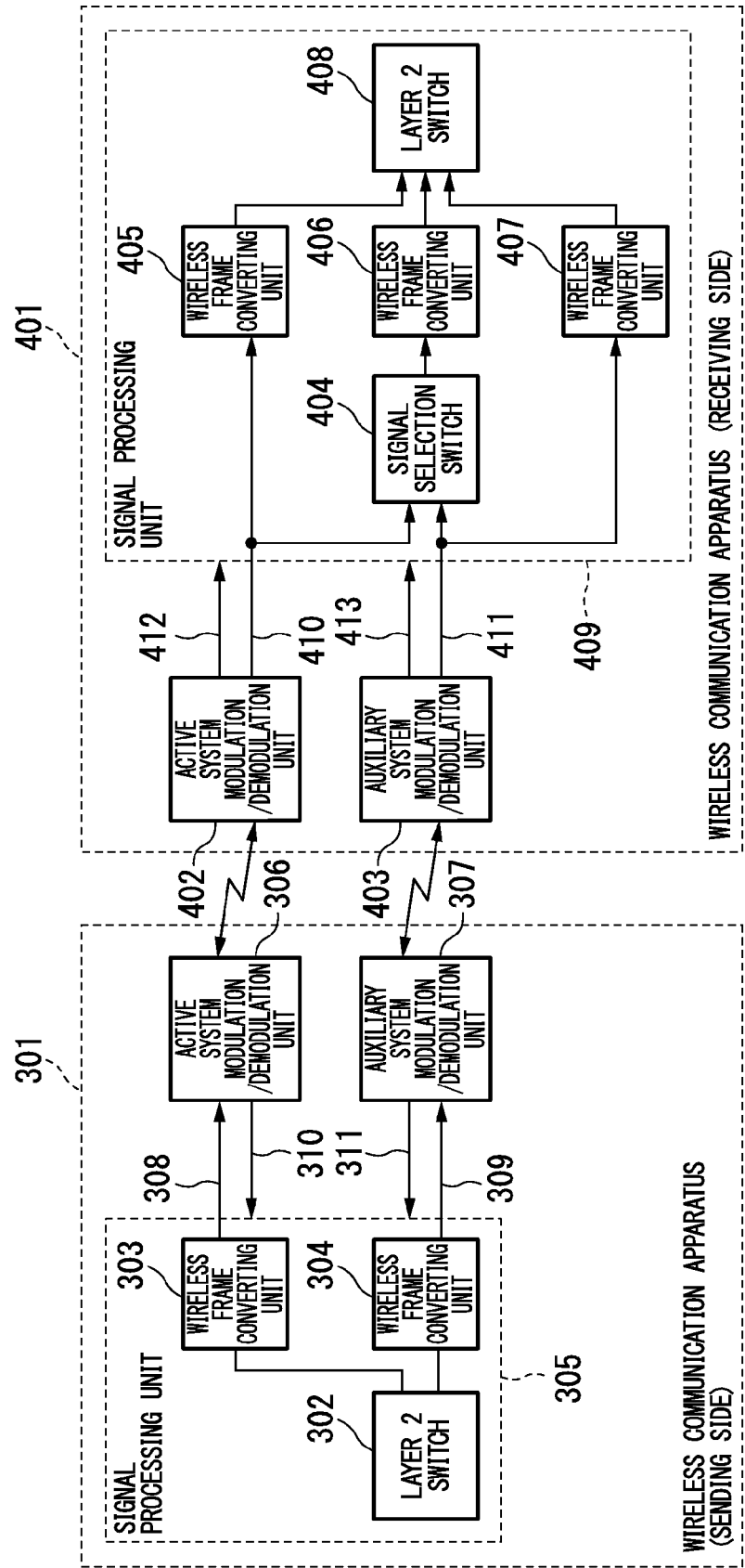
FIG. 1 is a block diagram that shows the constitution of one exemplary embodiment of the present invention.
Figure 2:
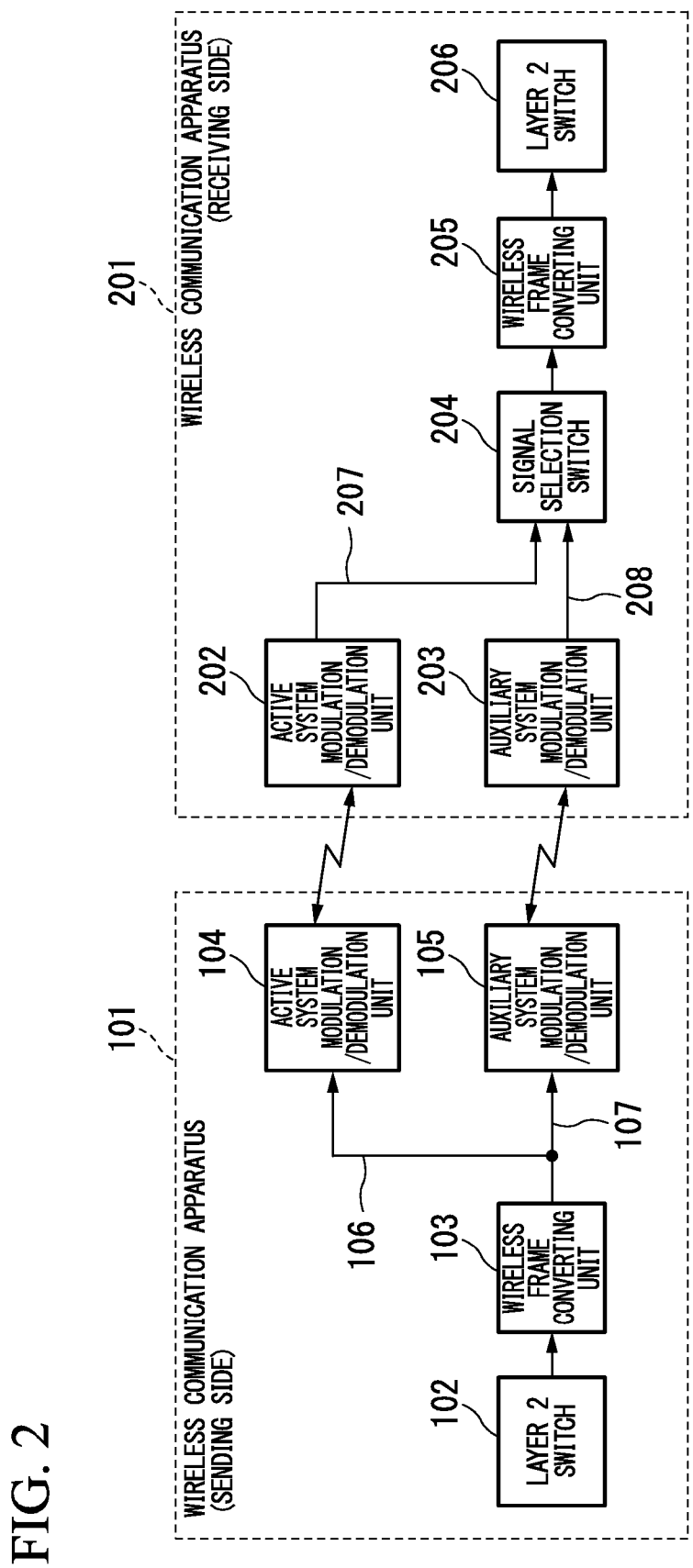
FIG. 2 is a block diagram that shows the constitution of a wireless communication apparatus according to a conventional art.

Hereinbelow, a wireless communication apparatus according to one exemplary embodiment of the present invention shall be described with reference to the drawings. FIG. 1 is a block diagram that shows the constitution of the present exemplary embodiment. The wireless communication apparatus shown in FIG. 1 is a wireless communication apparatus that employs the adaptive modulation radio scheme. Using this wireless communication apparatus, the case of building a network with a LAN (Local Area Network) such as Ethernet (registered trademark) shall be described. FIG. 1 shows a wireless communication apparatus 301 on the sending side and a wireless communication apparatus 401 on the receiving side. The wireless communication apparatus 301 includes a signal processing unit 305 that processes LAN signals, and an active system modulation/demodulation unit 306 and an auxiliary system modulation/demodulation unit 307 of two systems that perform modulation and demodulation and output reception line information. The wireless communication apparatus 401 includes a signal processing unit 409 that processes LAN signals, and an active system modulation/demodulation unit 402 and an auxiliary system modulation/demodulation unit 403 of two systems that perform modulation and demodulation and output reception line information. The signal processing unit 305 has a layer 2 switch 302, a wireless frame converting unit 303 corresponding to the active system modulation/demodulation unit 306, and a wireless frame converting unit 304 corresponding to the auxiliary system modulation/demodulation unit 307. The wireless frame converting unit 303 outputs an active system main signal 308 to the active system modulation/demodulation unit 306. The wireless frame converting unit 304 outputs an auxiliary system main signal 309 to the auxiliary system modulation/demodulation unit 307. The signal processing unit 409 includes a signal selection switch 404 that selects the signal of the active system and the auxiliary system, and wireless frame converting units 405, 406, and 407 of three systems. The active system modulation/demodulation unit 402 outputs the active system main signal 410 to the signal processing unit 401, that is, the signal selection switch 404 and the wireless frame converting unit 405. The auxiliary system modulation/demodulation unit 403 outputs the auxiliary system main signal 411 to the signal processing unit 401, that is, the signal selection switch 404 and the wireless frame converting unit 407.

The wireless communication apparatus shown in FIG. 1 increases the bandwidth used by the LAN by carrying out trunk setting using LACP (Link Aggregation Control Protocol) technology on both wireless communication paths, in the case of both the active system and the auxiliary system not having faults.

The operation of the wireless communication apparatus 301 and the wireless communication apparatus 401 shall be described referring to FIG. 1. The signal processing unit 305 receives the active system line information 310 outputted from the active system modulation/demodulation unit 306, and the auxiliary system line information 311 outputted from the auxiliary system modulation/demodulation unit 307, and monitors the respective line states of the active system and the auxiliary system. Moreover, the signal processing unit 305 monitors for hardware faults of the active system and the auxiliary system.

The signal processing unit 305 determines that wireless transmission by both the active system and the auxiliary system is possible when there is no line fault or hardware fault in both the active system and the auxiliary system. In this case, in the signal processing unit 305, the layer 2 switch 302 performs trunk setting for both ports connected with the wireless frame converting units 303 and 304. Thereby, it is possible to make the transmission capacity of the wireless communication apparatus 301 on the sending side double the case of not using the auxiliary system.

In the case of a fault occurring in either of the active system or the auxiliary system, the signal processing unit 305 operates with only the transmission path in which there is no fault by blocking the port in which the fault has occurred.

The signal processing unit 409 receives active system line information 412 outputted from the active system modulation/demodulation unit 402, and auxiliary system line information 413 outputted from the auxiliary system modulation/demodulation unit 403, and monitors the respective line states of the active system and the auxiliary system.

When there is no line fault in both the active system and the auxiliary system, the layer 2 switch 408 performs trunk setting for the ports connected with the wireless frame converting units 405 and 407, and blocks the connection port with the wireless frame converting unit 406 at a subsequent stage of the signal selection switch 404.

In the case of a line fault occurring in either of the active system or the auxiliary system, the layer 2 switch 408 blocks the ports connected with the wireless frame converting units 405 and 407, and opens the connection port with the wireless frame converting unit 406. In this case, in the same manner as a conventional twin path, the transmission path in which a line fault has not occurred is selected by the signal selection switch 404.

In this way, in the case of wireless communication being possible with both the active system and the auxiliary system, it is possible to double the wireless lines using the trunk function of a layer 2 switch. On the other hand, in the case of a fault having occurred in either of the active system or the auxiliary system, it is possible to carry out operation in the same way as a conventional twin path constitution. In addition, even in the case of the wireless bandwidth being narrowed by an adaptive modulation scheme, it is possible to secure double the conventional LAN transmission capacity, and so it serves as effective technology in today's networks in which the transmission capacity is less than a LAN such as Ethernet (registered trademark). Also, since hardware faults and continuous degradation of wireless lines are rare phenomena in current wireless communication apparatuses as indicated above, it is extremely practical.

As described above, in the twin-path configuration in an adaptive modulation scheme wireless communication apparatus that sets up an auxiliary line with a different frequency in a wireless section and switches to the auxiliary line during line degradation or a hardware fault, the auxiliary system is operated for signal transmission in the same manner as the active system in the case of there being no fault. With this constitution, it is possible to ensure the LAN transmission capacity. In today's networks, there is a tendency for the LAN transmission capacity to increase, so technology that ensures as much wireless bandwidth as possible has become indispensable. In the adaptive modulation scheme, when the wireless transmission quality decreases due to the influence of weather conditions or the like, since it operates so as to increase the system gain by lowering a multiple-valued number, the wireless transmission capacity ends up being reduced. As a result, the wireless transmission capacity may become smaller than the LAN transmission capacity. Thereby, since high-priority frames occupy the bandwidth in the wireless section, and the transmission delay of low-priority frames increases, a network bottleneck arises in the wireless section. However, in the present wireless communication apparatus, hardware faults and continuous degradation of a wireless line are rare phenomena. For that reason, the auxiliary system line becomes a waste of frequency and electrical power. With respect to this kind of problem, the auxiliary system of the twin-path constitution is put to use for signal transmission in the same manner as the active system, and the wireless band for LAN transmission is sufficiently ensured. For this reason, with the adaptive modulation scheme it is possible to remedy the problems of wireless section becoming a network bottleneck, and the wasting of frequency and electrical power in the twin-path constitution of a wireless communication apparatus.

A program for realizing the functions of the signal processing units 305 and 409 in FIG. 1 may be recorded on a computer-readable recording medium, and by reading the program that is recorded on this recording medium into a computer system and running it, signal processing may be executed. Note that a "computer system" here includes an OS and hardware such as peripheral devices. The "computer-readable recording medium" means a portable medium such as a flexible disk, magneto-optical disk, ROM, CD-ROM and the like, and a storage device such as a hard disk that is housed in a computer system. Further, this "computer-readable recording medium" also includes that which holds the program for a certain time, such as a volatile memory (RAM) within a computer system which functions as a server or client in the case of a program being transmitted over a network such as the Internet or telecommunications lines such as a telephone lines.

The program may also be transmitted to another computer system via a transmission medium, or by transmission waves in a transmission medium, from the computer system in which this program is stored in a storage device or the like. Here, the "transmission medium" for transmitting the program is a medium having a function for transmitting information such as a network (telecommunications network) such as the Internet, or telecommunications links (telecommunications lines) such as telephone lines. The program may also have the purpose of implementing some of the functions discussed above. Furthermore, the program may also be a so-called differential file (differential program), which can implement the functions discussed above in combination with a program already stored in the computer system.

This application is based upon and claims the benefit of priority from Japanese patent application No. 2010-116407, filed May 20, 2010, the disclosure of which is incorporated herein in its entirety by reference.

INDUSTRIAL APPLICABILITY

This can be applied to uses in which building a twin-path constitution is indispensable when building a network by a LAN (Local Area Network) such as Ethernet (registered trademark) using a wireless communication apparatus that employs the adaptive modulation radio scheme.

REFERENCE SYMBOLS 301, 401 Wireless communication apparatus
302, 408 Layer 2 switch
303, 304, 405, 406, 407 Wireless frame converting unit
306, 402 Active system modulation/demodulation unit
307, 403 Auxiliary system modulation/demodulation unit
404 Signal selection switch
305, 409 Signal processing unit

The invention claimed is:
1. A wireless communication apparatus that uses an adaptive modulation radio scheme, the apparatus comprising:
two-system transmission paths of an active system transmission path and an auxiliary system transmission path;
a line information acquiring unit that acquires line information indicating line states of the active system transmission path and the auxiliary system transmission path;
a signal processing unit that determines whether or not a fault occurs in the active system transmission path and the auxiliary system transmission path, based on the line information acquired by the line information acquiring unit;
an active system modulation/demodulation unit that outputs, to the line information acquiring unit, active system line information indicating the line state of the active system transmission path; and
an auxiliary system modulation/demodulation unit that outputs, to the line information acquiring unit, auxiliary system line information indicating the line state of the auxiliary system transmission path,
the signal processing unit carrying out trunk setting using link aggregation control protocol (LACP) technology on both of the active system transmission path and the auxiliary system transmission path, both paths being wireless communication paths, in order to perform a setting so as to perform wireless communication using the two-system transmission paths of the active system transmission path and the auxiliary system transmission path, in a case of determining that a fault does not occur in the active system transmission path and the auxiliary system transmission path, and
the signal processing unit performing a setting so as to perform wireless communication using only the transmission path in which a fault does not occur among the active system transmission path and the auxiliary system transmission path, in a case of determining that a fault occurs in either one of the active system transmission path and the auxiliary system transmission path, wherein the line information acquiring unit comprises:
a first wireless frame converting unit that acquires the active system line information from the active system modulation/demodulation unit, and outputs an active system main signal to the active system modulation/demodulation unit; and
a second wireless frame converting unit that acquires the auxiliary system line information from the auxiliary system modulation/demodulation unit, and outputs an auxiliary system main signal to the auxiliary system modulation/demodulation unit, and wherein:
the signal processing unit performs a setting so as to transmit the active system main signal to the active system modulation/demodulation unit via the first wireless frame converting unit and transmit the auxiliary system main signal to the auxiliary system modulation/demodulation unit via the second wireless frame converting unit, in a case of determining that a fault does not occur in the active system transmission path and the auxiliary system transmission path;
the signal processing unit performs a setting so as to transmit the auxiliary system main signal to the auxiliary system modulation/demodulation unit via the second wireless frame converting unit and not transmit the active system main signal to the active system modulation/demodulation unit via the first wireless frame converting unit, in a case of determining that a fault occurs in the active system transmission path; and
the signal processing unit performs a setting so as to transmit the active system main signal to the active system modulation/demodulation unit via the first wireless frame converting unit and not transmit the auxiliary system main signal to the auxiliary system modulation/demodulation unit via the second wireless frame converting unit, in a case of determining that a fault occurs in the auxiliary system transmission path.

2. A wireless communication method for a wireless communication apparatus that uses an adaptive modulation radio scheme, the method comprising:
a line information acquiring step of acquiring line information indicating line states of an active system transmission path and an auxiliary system transmission path, the line information acquiring step being performed by a line information acquiring unit;
a signal processing step of determining whether or not a fault occurs in the active system transmission path and the auxiliary system transmission path, based on the line information acquired by the line information acquiring step, the signal processing step being performed by a signal processing unit;
an active system modulation/demodulation step of outputting, to the line information acquiring unit, active system line information indicating the line state of the active system transmission path, by an active system modulation/demodulation unit; and
an auxiliary system modulation/demodulation step of outputting, to the line information acquiring unit, auxiliary system line information indicating the line state of the auxiliary system transmission path, by an auxiliary system modulation/demodulation unit, the signal processing step carrying out trunk setting using link aggregation control protocol (LACP) technology on both of the active system transmission path and the auxiliary system transmission path, both paths being wireless communication paths, in order to perform a setting so as to perform wireless communication using the two-system transmission paths of the active system transmission path and the auxiliary system transmission path, in a case of determining that a fault does not occur in the active system transmission path and the auxiliary system transmission path, and
the signal processing step performing a setting so as to perform wireless communication using only the transmission path in which a fault does not occur among the active system transmission path and the auxiliary system transmission path, in a case of determining that a fault occurs in either one of the active system transmission path and the auxiliary system transmission path, wherein the line information acquiring step comprises:
a first wireless frame converting step of acquiring the active system line information from the active system modulation/demodulation unit, by a first wireless frame converting unit, and outputting an active system main signal to the active system modulation/demodulation unit, by the first wireless frame converting unit; and
a second wireless frame converting step of acquiring the auxiliary system line information from the auxiliary system modulation/demodulation unit, by a second wireless frame converting unit, and outputting an auxiliary system main signal to the auxiliary system modulation/demodulation unit, by the second wireless frame converting unit, and wherein:
in the signal processing step, the signal processing unit performs a setting so as to transmit the active system main signal to the active system modulation/demodulation unit via the first wireless frame converting unit and transmit the auxiliary system main signal to the auxiliary system modulation/demodulation unit via the second wireless frame converting unit, in a case of determining that a fault does not occur in the active system transmission path and the auxiliary system transmission path;
in the signal processing step, the signal processing unit performs a setting so as to transmit the auxiliary system main signal to the auxiliary system modulation/demodulation unit via the second wireless frame converting unit and not transmit the active system main signal to the active system modulation/demodulation unit via the first wireless frame converting unit, in a case of determining that a fault occurs in the active system transmission path; and
in the signal processing step, the signal processing unit performs a setting so as to transmit the active system main signal to the active system modulation/demodulation unit via the first wireless frame converting unit and not transmit the auxiliary system main signal to the auxiliary system modulation/demodulation unit via the second wireless frame converting unit, in a case of determining that a fault occurs in the auxiliary system transmission path.

* * * * *